United States Patent [19]

den Otter

[11] 4,443,110
[45] Apr. 17, 1984

[54] METHOD FOR MIXING AND MASTICATING HIGHLY VISCOUS MATERIALS

[75] Inventor: Johan L. den Otter, Leidschendam, Netherlands

[73] Assignee: Nederlandse Centrale Organisatie voor Toegepast Natuurwetenschappelijk, The Hague, Netherlands

[21] Appl. No.: 340,326

[22] Filed: Jan. 18, 1982

[30] Foreign Application Priority Data

Jan. 20, 1981 [NL] Netherlands .......................... 8100247

[51] Int. Cl.³ .......................... B01F 15/06; B29B 1/06; B28C 1/16
[52] U.S. Cl. ...................................... 366/97; 364/506; 364/557; 366/144; 366/147; 366/149; 366/601; 425/143; 425/162
[58] Field of Search ...................... 366/69, 76, 77, 79, 366/96–99, 142, 144–148, 149, 318, 601, 297–301; 425/144, 162, 143, 207, 209; 264/349; 364/506, 556, 557

[56] References Cited

U.S. PATENT DOCUMENTS 3,500,496 3/1970 Perlberg et al. ...................... 425/144
3,951,389 4/1976 Porter .
3,999,046 12/1976 Porter ............................... 366/142 X
4,076,220 2/1978 Nakashima et al. ................... 366/69

FOREIGN PATENT DOCUMENTS 901309 11/1953 Fed. Rep. of Germany .
969063 4/1958 Fed. Rep. of Germany .
552515 4/1943 United Kingdom .

OTHER PUBLICATIONS

Rubber Chemistry and Technology, vol. 48, No. 3, 1975, pp. 489–493.

Primary Examiner—Timothy F. Simone
Attorney, Agent, or Firm—Armstrong, Nikaido, Marmelstein & Kubovcik

[57] ABSTRACT

A method for mixing and masticating highly viscous materials in a mixing apparatus comprising a mixing chamber the wall of which is provided with heat exchange means for heating and cooling and at least one rotor, driven by a motor, wherein the energy utilized for mixing and masticating (UE) and the supplied energy (SE) are determined by recording the couple and the number of revolutions of the rotors, and the heat exchanged between the materials treated and the wall is determined by recording the temperature of the materials treated, the temperatures of the heat transfer medium on entering and leaving the heat exchange circuit and the flow rate of the heat transfer medium, and the ratio of UE to SE is adjusted to an optimal value at a minimal SE.

3 Claims, 1 Drawing Figure

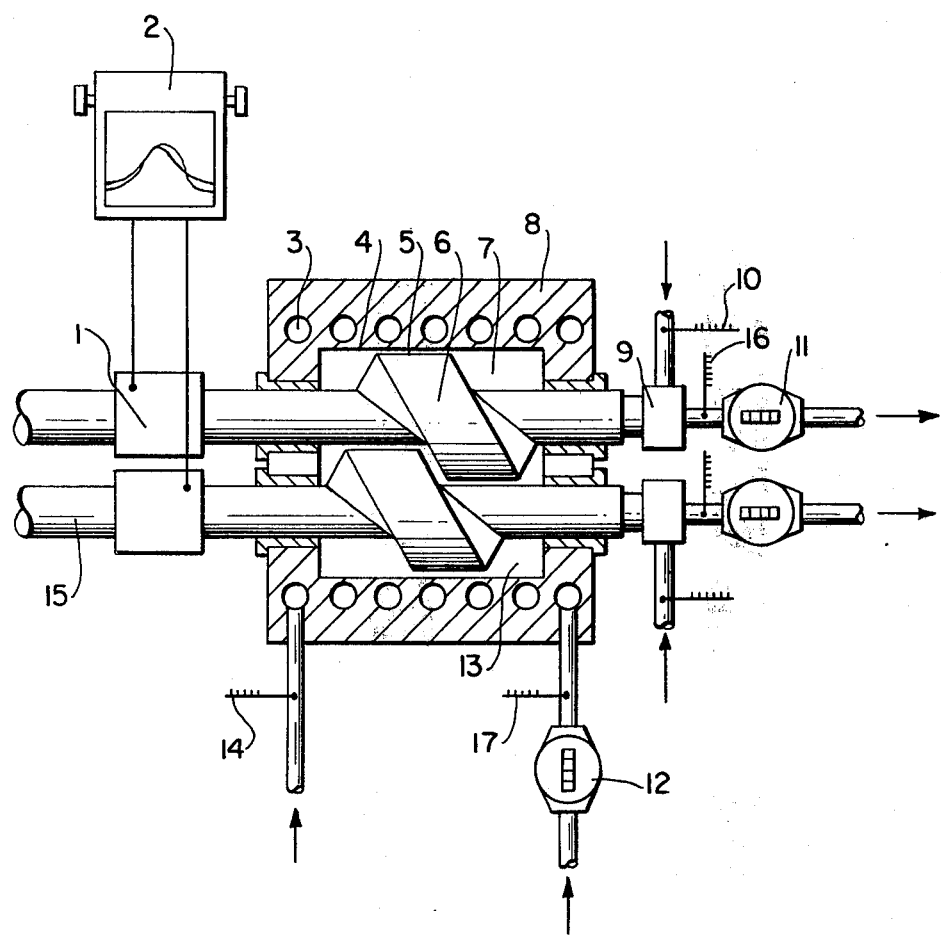

METHOD FOR MIXING AND MASTICATING HIGHLY VISCOUS MATERIALS

BACKGROUND OF THE INVENTION a. Field of the Invention

The present invention relates to a method for mixing and masticating highly viscous materials.

b. Description of the Prior Art

Hitherto it has been customary in industry to mix and to masticate highly viscous materials, such as for example natural and synthetic rubbers, if desired together with additives such as soot, carbon black, clay, vulcanization starters and the like, in an apparatus suitable for that purpose, such as for example a Banbury mixer, as part of the total treatment.

Said mixing is effected in a mixing apparatus comprising a mixing chamber provided with a pair of rotors, driven by a motor, said rotors rotating in opposite direction, and the wall of the mixing chamber being provided with a cooling coil, providing cooling of the wall during the complete treatment continuously and with even circulation velocity of the coolant, except for starting procedures. The selection of the conditions during mixing and masticating is usually on an empirical basis. A consequence thereof is, that the mixing apparatus is not used in the most effective manner, and thus the quality of the product formed will not be optimal, or alternatively the amount of energy required will be excessive. Also the homogenity and the plasticity of the products thus obtained will often not be constant, which is undesirable, as this may lead to problems during further treatment, as this may result in products with inconstant and occasionally undesirable properties.

According to one method the total energy and the number of revolutions of the rotors are recorded, while simultaneously the temperature of the materials treated is recorded. Though this method allows more quality control of the products obtained by mixing and masticating the materials, this treatment is still largely empirical with all the disadvantages resulting therefrom. As a consequence thereof the mixing will frequently be insufficient whereby the resulting product will be inhomogeneous of insufficiently masticated, or the mixing will be continued for too long a period of time, thus resulting in a needless loss of energy as it does not make use of minimal energy for optimal quality.

SUMMARY OF THE INVENTION

The inventor of the present invention in his study of mixing and masticating highly viscous materials, such as natural and synthetic rubbers, in particular polyvinylchloride (PVC) and certain fats, has found that the above mentioned disadvantages can be mitigated or avoided.

It is a primary object of the invention to make optimal use of the supplied energy (SE) for mixing and masticating and to record the utilized energy (UE) accurately. Thus it is possible to ensure at the same time a good reproducibility and a homogenity and plasticity of the product without unacceptable fluctuations.

It is a further object of the invention to provide a method for mixing and masticating highly viscous materials, wherein the supplied energy (SE) and the utilized energy (UE) are recorded as well as the temperature of the materials in the mixing apparatus and optionally the temperatures of the heat transfer medium on entering and leaving the heat exchange circuit and the flow rate of the heat transfer medium in order to optimize the ratio of UE to SE at a minimal SE.

It is a still further object of the invention to provide a method for mixing and masticating highly viscous materials in a mixing apparatus, comprising a mixing chamber, the wall of which can be cooled or heated by means of at least one heat exchange duct, and at least one rotor, driven by a motor, wherein the energy (UE) utilized for mixing and masticating is determined by recording the torque and the number of revolutions of the rotors, and also the supplied energy (SE) is determined, and simultaneously the temperatures of the heat transfer medium on entering and leaving the heat exchange duct and the flow rate of the heat transfer medium, wherefrom the amount of heat exchanged between the materials and the wall is determined, these data allowing adjustment of the number of revolutions and the rate of heat exchange for obtaining optimal use of the supplied energy (SE).

It is a still further object of the invention to provide a mixing apparatus for use in the above method for mixing and masticating highly viscous materials, comprising a mixing chamber provided with at least one rotor, driven by a motor, the wall of the mixing chamber being provided with at least one heat exchange duct provided with an inlet and an outlet for a heat transfer medium as well as means for recording the torque and the number of revolutions of any rotor, and means for recording the temperature of the materials being treated in the mixing chamber of the mixing apparatus and means for independent recording of the temperatures of the heat transfer medium at the inlet and the outlet of any heat exchange duct and means for recording the amount of heat transfer medium passing the heat exchange duct per unit of time.

BRIEF DESCRIPTION OF THE DRAWING

The foregoing and other objects and advantages of the invention will become more readily apparent from the following description of the preferred embodiment of the mixing apparatus according to the invention as taken inconjunction with the accompanying drawing, which is part hereof and wherein a fragmentary sectional view taken vertically through an electrically driven mixing apparatus is provided.

DESCRIPTION OF THE PREFERRED EMBODIMENT

The preferred embodiment of the mixing apparatus according to the invention comprises a mixing chamber 13 confined by a wall 8, comprising a heat exchange coil of which one cross-section is indicated by 3. The rotors 6 are driven from the exterior by driving shafts 15. In order to be able to supply or to withdraw heat prior to or during the mixing and masticating process, the rotors are hollow and they are provided with a coupling 9 through which a heat transfer medium can flow in and out. The temperature of the inflowing heat transfer medium is recorded with a thermometer 10 ("thermometer" is used in this specification to indicate any device for measuring temperatures) and the down-stream temperature of the heat transfer medium is recorded with thermometer 16. Simultaneously the amount of heat transfer medium passing per unit of time is recorded by a flow meter 11. In a similar manner the temperature of the inflowing heat transfer medium of heat exchange coil 3 is recorded by thermometer 14 (the arrow indicates the direction of flow of the heat transfer medium), while the temperature of the outflowing heat transfer medium is recorded by thermometer 17. The amount of heat transfer medium passing per unit of time is recorded by flow meter 12. In the drawing the latter is shown in the outlet conduit, but can if desired also be positioned in the inlet conduit towards the heat exchange coil. The wall 8 of the mixing chamber 13 is also provided with a thermometer 4 and every rotor is provided with a thermometer 5. In the mass of highly viscous material in mixing chamber 13 is positioned a thermometer 7. Moreover the torque and the numbers of revolutions are recorded by means of a signal source 1, located between each driving shaft 15 and every rotor 6 in a manner customary in itself for that purpose. The data thus recorded may be fed into a control apparatus for the mixing and masticating (not shown), that suitably can be a computer, but may also be fed into a visual recording apparatus 2. The rotors present in such a mixing apparatus may rotate in opposite direction with respect to each other with identical or differing velocities or they may rotate in the same direction with respect to each other with differing velocities. As in this latter embodiment only a part (the difference between the velocities) of the rotational energy is effectively used for mixing and masticating, it is preferable from a viewpoint of energy to use rotors rotating in opposite direction to each other.

The interior of wall 8 can optionally be roughened, thus suppressing slip at the wall. Especially a roughening of the wall in the areas where the rotors approach wall 8 closest, has a beneficial effect. Such a roughening may cover the complete surface of wall 8 or cover only the part of wall 8 closest to the rotors for 50–100%. In addition thereto the surfaces of the rotors may be roughened, in particular in the areas where the distance to other surfaces is slight at any stage. These surfaces as well need not be roughened completely, as a favorable effect is frequently obtained with a partial roughening of for example 50% or even less. In particular when the interior of wall 8 is roughened, it is also possible to use a mixing apparatus provided with only one rotor, as a substantial part of the increased internal mastication of the materials treated is caused by the roughening. Such a roughening also contributes to a better dispersion of possible additives.

Depending on the conditions the heat exchange ducts are used to cool or to heat to a lesser or greater extent the materials treated in the mixing apparatus. Heating may be advantageous at the start of the mixing and masticating, such as by passing the heat transfer medium at increased temperature through the heat exchange ducts. As far as I know the temperature and the flow rate of the heat transfer medium during mixing and masticating have always been kept constant. According to the present invention a sufficient and optimal mixing and masticating are achieved with a minimal expenditure of supplied energy (SE).

By means of the method according to the invention the time required for mixing and masticating is adjustable.

The supplied energy (SE) is converted in part into mixing-and mastication energy (UE) in the materials processed and in part is lost by slip at the metal wall as slip energy (SIE). This slip energy (SIE) is predominantly absorbed by the metal wall and is disposed therefrom by means of the heat transfer medium. Thus this energy is almost completely lost for mixing and mastication. On the other hand the mixing and mastication energy (UE) in the materials treated will almost completely be converted into heat, which will cause mainly an increase of the temperature of the materials treated. As indicated above, part of this heat will diffuse into the rotors and the wall of the mixing apparatus. The distribution of the heat disposal can thus be recorded accurately by recording on the one hand the temperature of the mixed and masticated materials and on the other hand the temperature of the rotors and the wall of the mixing apparatus, taking into account the thermal properties thereof. From the data thus obtained the effective mixing and mastication energy (UE) and the slip energy (SlE) can be determined.

It is therefore possible to mix and to masticate in such a way that the supplied energy (SE) is as small as possible and the mixing and mastication energy (UE) is as high as possible, thus providing on the one hand a substantial saving in energy of at least 10% but usually considerably higher, and in some cases even 50% or more, depending on the type of starting materials and the quality of the apparatus used, whereas on the other hand as a consequence of the improved mixing and masticating treatment a qualitatively improved product is obtained, having reproducible homogeneity and plasticity.

The results of the method according to the invention are favorably affected by roughening the interior active surfaces of the mixing apparatus in a way as described in the corresponding U.S. patent application Ser. No. 06/340,325 filed Jan. 18, 1982 of the same priority date as the present application, and its contents should be considered as incorporated herein. As the slip energy (SlE) is decreased as a consequence of the roughening of the inner wall of the mixing chamber, a larger part of the supplied energy (SE) is converted into mixing and mastication energy (UE).

The following examples illustrate the way in which the method according to the invention was employed. In all examples rubber from the same batch was mixed and masticated to the same degree of dispersion of carbon black (Cabott Chart as customary in industry) and plasticity in a Banbury mixer.

In the first example the mixer was, by way of comparison, operated as usual, keeping the temperature and the flow rate of the cooling water, used as heat transfer medium, constant.

In the second example the temperature and the flow rate of the cooling water were adjusted, using the mixer according to the invention by controlling the flow rate of the cooling water and by adjusting the speed of the rotors, in order to obtain a more efficient use of energy.

In the third example the conditions were the same as in the second example except that the wall of the mixer was roughened, whereas in the second example the wall was smooth.

The results obtained are summarized in the following Table:

|  | Supplied energy | Utilized energy | Slip energy |
| --- | --- | --- | --- |
| Example 1 | 3.15 kWh | 1.95 kWh | 1.20 kWh |
| Example 2 | 2.85 kWh | 1.95 kWh | 0.90 kWh |
| Example 3 | 2.45 kWh | 1.75 kWh | 0.70 kWh |

It appears from the above Table that in examples 2 and 3 the supplied energy (SE) was lower than in the comparative example 1 (about 9.5% and 22% respectively) and that the efficiency notwithstanding this decreased energy supply had improved by 10.5% and 15.4% respectively, based on the ratio of SE to UE (utilized energy). In addition it appears that roughening of the wall provides an improvement of 9.4% over the result with the identical apparatus with a smooth wall.

Although the invention has been described in conjunction with a preferred embodiment, it is apparent that various modifications may be made without departing from the concept and scope of the present invention as defined in the claims.

What is claimed is:

1. A method of mixing highly viscous materials in a mixer consisting of a mixing chamber with at least one rotor rotably mounted within the chamber and driven by a drive, the container wall being provided with cooling means through which a coolant flows, comprising measuring the torque of the rotor, counting the number of revolutions of the rotor, measuring the temperature of the materials being mixed, measuring the temperature of the wall of the chamber, measuring the amount of coolant flow through the cooling means, measuring the temperature rise of the coolant, determining during a period of time with a constant velocity of rotation of the at least one rotor, at least two of the three quantities: supplied energy (SE), utilized energy (UE), and slip energy (SlE), the SE being calculated from the product of the measured torque exercised on the at least one rotor and the counted number of revolutions of the rotor, the UE being the sum of the energy accumulated in the viscous material calculated from the product of the measured temperature rise, the weight and specific heat of this material, the energy removed from the viscous material through the wall calculated from the product of the coefficient of heat transfer from the material to the wall, the measured temperature differences between the material and the wall, and the wall area in contact with the material, and the SlE being the difference between the energy removed from the wall calculated from the product of the amount of coolant used for cooling the wall and the average rise of the temperature of this coolant during cooling, and the energy removed from the viscous material through the wall, calculating the value of the ratio of UE/SE possibly by using the formula SE=UE+SlE, repeating the above procedure for different values of the velocity of rotation, determining the value of the velocity of rotation for which the ratio E/SE has a maximum value and maintaining that velocity at that value.

2. The method of mixing highly viscous materials as claimed in claim 1 further, wherein the at least one rotor is also provided with cooling means, and the method comprises the further steps of measuring the amount of coolant flow through the cooling means of the at least one rotor, measuring the temperature rise of the coolant through the cooling means of the at least one rotor, and adding in the energy removed from the rotor into the UE by calculating the product of the amount of coolant that flows through the rotor and the average rise of temperature of the coolant while passing through the rotor.

3. The method of mixing highly viscous materials as claimed in either claim 1 or claim 2 further comprising the step of adjusting the cooling means to keep the temperature of the material being mixed substantially constant.

* * * * *

UNITED STATES PATENT AND TRADEMARK OFFICE
CERTIFICATE OF CORRECTION

PATENT NO. : 4,443,110
DATED : April 17, 1984
INVENTOR(S) : JOHAN L. den OTTER

It is certified that error appears in the above-identified patent and that said Letters Patent is hereby corrected as shown below:

On the cover page, Item [73], change "Nederlandse Centrale Organisatie voor Toegepast Natuurwetenschappelijk" to
--- Nederlandse Centrale Organisatie voor Toegepast Natuurwetenschappelijk Onderzoek ---.

Signed and Sealed this

Twenty-seventh Day of August 1985

[SEAL]

Attest:

DONALD J. QUIGG

Attesting Officer

Acting Commissioner of Patents and Trademarks